US008805822B2

(12) United States Patent
Jaffer et al.

(10) Patent No.: US 8,805,822 B2
(45) Date of Patent: Aug. 12, 2014

(54) KNOWLEDGE BASE SEARCH UTILITY

(75) Inventors: Akbar Jaffer, Union City, CA (US); Richard Dean Day, Ashburn, VA (US); Ameet B. Nayak, Sterling, VA (US)

(73) Assignee: Oracle International Corporation, Redwood Shores, CA (US)

( * ) Notice: Subject to any disclaimer, the term of this patent is extended or adjusted under 35 U.S.C. 154(b) by 717 days.

(21) Appl. No.: 12/114,114

(22) Filed: May 2, 2008

(65) Prior Publication Data

US 2009/0276400 A1 Nov. 5, 2009

(51) Int. Cl.
*G06F 17/30* (2006.01)

(52) U.S. Cl.
USPC ............... 707/722; 707/754; 707/805

(58) Field of Classification Search
CPC .................... G06F 17/30864; G06F 17/30867; G06F 17/30286
USPC .......... 707/707, 722, 721, 754, 805; 715/733, 715/751; 709/201, 227
See application file for complete search history.

(56) References Cited

U.S. PATENT DOCUMENTS

| 8,112,529 B2* | 2/2012 | van den Oord et al. | 709/227 |
| 2003/0115187 A1* | 6/2003 | Bode et al. | 707/705 |
| 2004/0044585 A1* | 3/2004 | Franco | 705/26 |
| 2005/0193055 A1* | 9/2005 | Angel et al. | 709/202 |
| 2006/0184512 A1 | 8/2006 | Kohanim et al. | 1/1 |
| 2007/0263838 A1* | 11/2007 | Wiseman et al. | 379/265.02 |
| 2007/0286180 A1* | 12/2007 | Marquette et al. | 370/356 |
| 2008/0071939 A1* | 3/2008 | Tanaka et al. | 710/18 |
| 2008/0222184 A1* | 9/2008 | Wang | 707/707 |
| 2009/0287665 A1* | 11/2009 | Prahlad et al. | 707/705 |
| 2010/0251162 A1* | 9/2010 | Stallings et al. | 715/777 |
| 2011/0171939 A1* | 7/2011 | Deliwala et al. | 455/414.1 |
| 2011/0202867 A1* | 8/2011 | Viswanathan et al. | 715/781 |
| 2013/0231970 A1* | 9/2013 | Trefler et al. | 705/7.14 |

* cited by examiner

*Primary Examiner* — Mariela Reyes
*Assistant Examiner* — Alexandria Bromell
(74) *Attorney, Agent, or Firm* — Campbell Stephenson LLP

(57) ABSTRACT

A method is disclosed. The method includes performing a first search in response to initiating a communication session between an agent and a customer. The first search is performed using first data, attributes of a service interaction, and second data. The first data represents a second search requested by the customer, and the second data represents items viewed by the customer from among first results of the second search. Second results of the first search are displayed.

23 Claims, 9 Drawing Sheets

KNOWLEDGE BASE SEARCH UTILITY

BACKGROUND

Agent interfaces are becoming increasingly sophisticated in their ability to allow access to numerous types of application data and/or application systems across multiple forms of communication. For example, a typical customer service application may include an agent interface to allow a customer service agent to navigate among a variety of types of data related to a customer and to products. Such product data may include a knowledge base or other database of product information, while customer data may include contact information, service request information, order information, activity information, and so on. A customer service agent interacting with a customer may need to navigate quickly all of these types of information during, for example, the course of a single telephone conversation. Additionally, a subset of both the customer data and the product data may be available to the customer for self-guided retrieval of information without agent intervention.

In order to provide personalized service, it is desirable that customer service agents appear to "know" the customer immediately when starting an interaction and throughout its duration. Since customer service centers receive a large volume and variety of customer interactions during a typical day, each agent needs to have quick access to important customer information, such as contact name, account number, phone number, and so on. Additionally, customer service agents need to find, in the most efficient manner possible, the information needed by the customer. When an agent wastes time by fumbling with an agent interface for a search engine, suggesting to a customer an inapplicable resource, or offering a resource that the customer has already viewed and dismissed, costs are increased. These costs come in both the form of agent time and the form of customer dissatisfaction.

SUMMARY

A method is disclosed. The method includes performing a first search in response to initiating a communication session between an agent and a customer. The first search is performed using first data, attributes of a service interaction, and second data. The first data represents a second search requested by the customer, and the second data represents items viewed by the customer from among first results of the second search. Second results of the first search are displayed.

BRIEF DESCRIPTION OF THE DRAWINGS

The present invention may be better understood, and its numerous objects, features and advantages made apparent to those skilled in the art by referencing the accompanying drawings.

Figure 1:
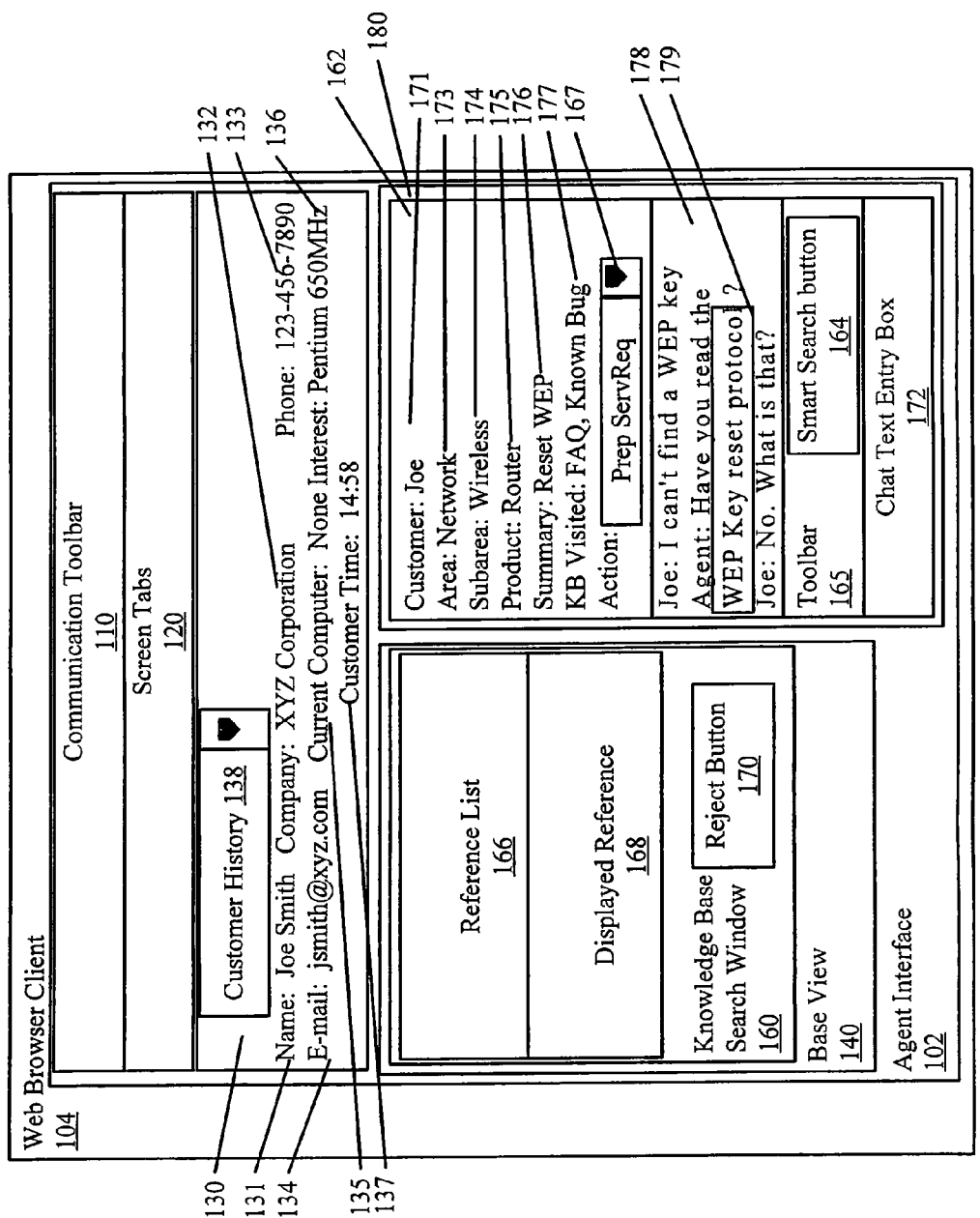
FIG. 1 provides an example of an agent interface including a both a chat utility and a search utility in accordance with one embodiment of the present invention.

The use of the same reference symbols in different drawings indicates similar or identical items. While the invention is susceptible to various modifications and alternative forms, specific embodiments thereof are shown by way of example in the Drawings and are described herein in detail. It should be understood, however, that the Drawings and Detailed Description are not intended to limit the invention to the particular form disclosed. On the contrary, the intention is to cover all modifications, equivalents, and alternatives falling within the scope of the present invention as defined by the appended Claims.

DETAILED DESCRIPTION

For a thorough understanding of the subject invention, refer to the following Detailed Description, including the appended Claims, in connection with the above-described Drawings. Although the present invention is described in connection with one or more embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent in light of the present disclosure, however, to one skilled in the art that the invention can be practiced without these specific details.

References in the specification to "one embodiment" or "an embodiment" mean that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention addresses several shortcomings of existing techniques. Specifically, one embodiment of the present invention provides for the search and retrieval of stored information based on attributes of a customer, attributes of a service interaction between the customer and an enterprise, and items viewed by a customer. Using one embodiment of the present invention, a search can be triggered by a communication event or by a search request from an agent, for example, and search results (and their display) tuned on the basis of items previously viewed by the customer and the agent.

FIG. 1 shows an agent interface 102 presented for agent use by a web browser client 104. In one embodiment, no client software other than a web browser is needed to run the agent interface for the host application. Agent interface 102 includes a communication toolbar 110, screen tabs 120, a persistent dashboard 130, a chat window 180 and a base view 140. Base view 140 contains a knowledge base search window 160. Communication toolbar 110 and screen tabs 120 are not essential for the operation of a knowledge base search window 160. Knowledge base search window contains a reference list 166 and a displayed reference 168, as well as a reject button 170. Base view 140 represents a display window in which application data are displayed, such that the dashboard 130 provides context information related to the application data.

Communication toolbar 110 enables an agent to communicate via multiple types of communication channels, such as e-mail, telephone, facsimile, text chat and wireless messaging. Screen tabs 120 enable an agent to navigate among various types of application data.

Chat window 180 supports communication between a customer and an agent through text-based messaging, which can include transmission of messages containing a markup language such as HTML, for example. In some embodiments, the chat window can additionally support moving video and audio communication. A customer information pane 162 provides information relevant to a customer interaction, such as a username 171, which may contain any identifier used to communicate with a customer, such as a customer's name, username or handle. An area 173 broadly represents a product or service type of interest to the customer on the basis of the customer's indication of interest or data previously stored in relation to the customer. A subarea 174 more narrowly defines the product or service type of interest to the customer on the basis of the customer's indication of interest or data previously stored in relation to the customer. A product 175 defines the specific offering of interest to the customer on the basis of the customer's indication of interest or data previously stored in relation to the customer. A summary 176 provides a brief description of the problem that the customer is trying to solve. KB visited 177 indicates the portions of a knowledge base that the customer has reviewed, typically before communicating with a live agent. An action pulldown menu 167 enables an agent to quickly access actions that may be relevant to the customer's situation, such as preparation of a service request. A chat text entry box 172 allows the agent to enter text for transmission to a customer.

A session window 178 displays a record of transmissions between an agent and a customer. In the chat window, highlighted text 179 can be selected with a mouse, for a cut-and-paste or a search operation. A toolbar 165 allows for the placement of buttons, such as smart search button 164.

In the exemplary embodiment shown in FIG. 1, persistent dashboard 130 includes various data fields such as contact name 131, company 132, phone 133, e-mail 134, current computer 135, interest 136, and customer time 137. Persistent dashboard 130 also includes customer history combo box 138, which enables the agent to view in base view 140 the history of previous communications with the customer whose information is displayed in persistent dashboard 130. As mentioned above, the data fields included in a persistent dashboard, such as persistent dashboard 130, are configurable according to the present invention. For example, an account number, customer's local time, or other relevant context information can be selected to be displayed in persistent dashboard 130. Furthermore, customer dashboard 130 may be configured to include, for example, Previous and Next buttons (not shown) to enable scrolling to and from information related to previous activity of the agent using the host application, such as calls that the agent had previously attended to during a session using the host application.

In the example embodiment shown, persistent dashboard 130 is visible as a separate frame below the communications toolbar 110 and screen tabs 120 and above the frame including base view 140. In base view 140, the agent can navigate among various types of application data and/or different screens and view of agent interface 102, while persistent dashboard 130 provides a persistent view of context information related to the application data presented in base view 140. For example, the customer service agent can quickly navigate to information related to the active customer in persistent dashboard 130 by selecting from the combo box 138 of persistent dashboard 130. The list of views to which the agent can navigate is customizable and, for example, may include the following:

Contact—Activities (default)
Contact—Activity Plans
Contact details
Contact—Service Requests
Contact—Agreements
Contact—Entitlements
Contact—Campaigns
Contact—Opportunities.

When a view is selected, one or more records related to the active customer are displayed in base view 140.

In one embodiment of the present invention, a website for a customer provides access to a repository of information in a knowledge base. As is described with respect to FIG. 9, a customer interface provides a search utility for allowing the customer to search the knowledge base and retrieve data. Searches are optionally tuned to refine results on the basis of data relating to the customer. During the customer's interaction with the search utility, data is gathered, both from the customer and from a database, which is used to populate persistent dashboard 130 and customer information pane 162. The data gathered to populate persistent dashboard 130 and customer information pane 162 is also used to refine search results performed by an agent at the request of the customer.

When the customer requests a chat with an agent, persistent dashboard 130 and customer information pane 162 are populated with the gathered data that is passed in the chat request. A search is also performed, using the data from persistent dashboard 130 and customer information pane 162. Reference list 166 is populated with the results of the search, and an agent can select a reference to be shown in a window as displayed reference 168. The search performed to populate reference list 166 and the references displayed (as well as their manner of display) are configurably altered on the basis of the searches performed by the customer prior to the initiation of a chat session and the results viewed by the customer.

The context information displayed in persistent dashboard 130 is changed in response to certain actions, which are referred to herein as changes in context. For example, a change in context can include receiving a communication event, obtaining data entered by a customer, focusing on a data record, and selecting a search results record. Actions such as switching to a new screen or view of the agent interface, or viewing a different type of application data, are not considered to trigger changes in context unless accompanied by one of the aforementioned context-changing actions. In one embodiment of the present invention, a new search is performed and references displayed in reference list 166 are updated in response to configurably-selected changes in context. Changing of the view or viewing of a different type of data at base window 140 followed by selection of an update button (not shown) on the persistent dashboard 130 also changes the context of the dashboard.

Figure 9:
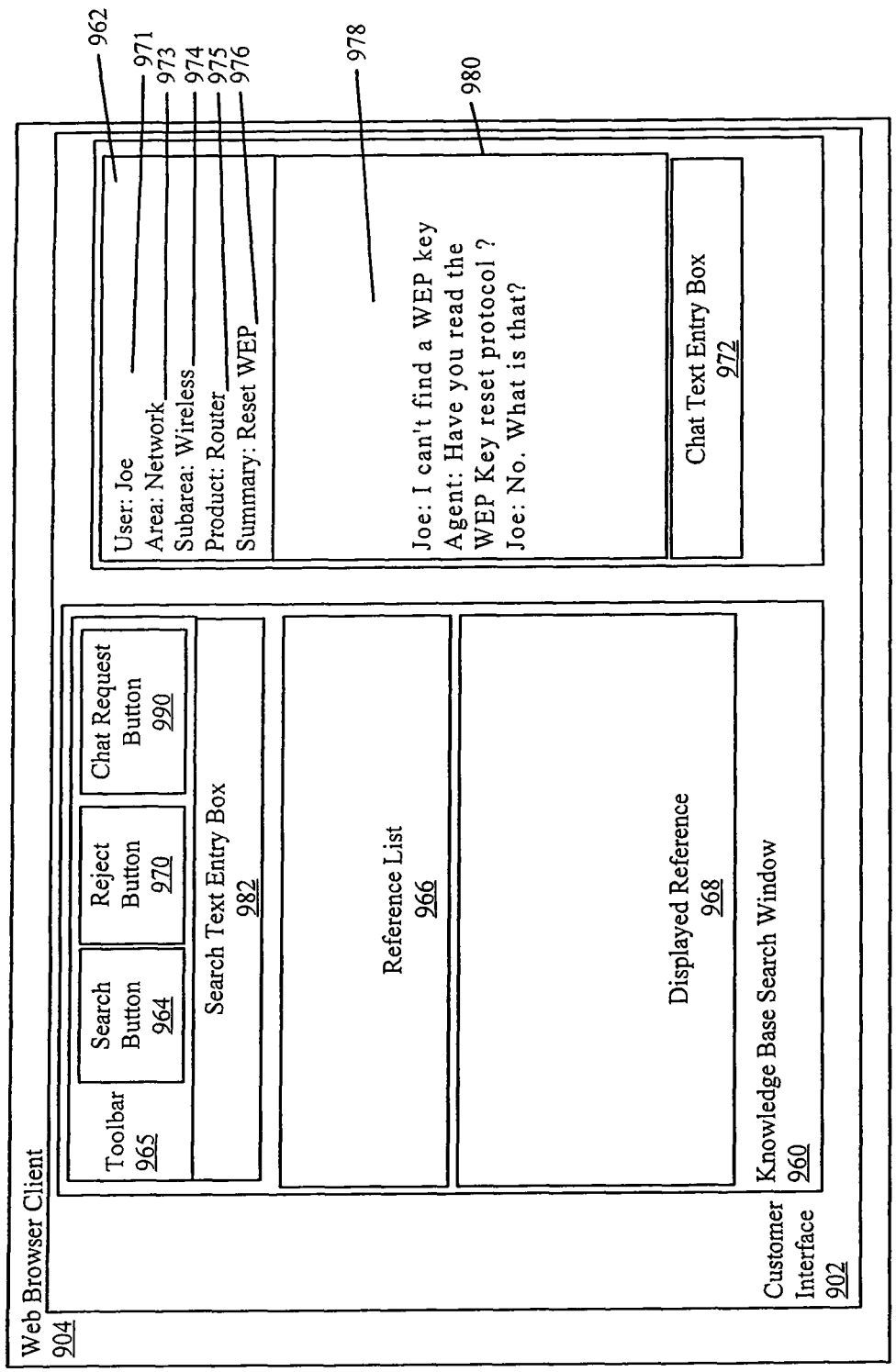
FIG. 9 provides an example of a customer interface including a search utility and a chat utility in accordance with one embodiment of the present invention.

FIG. 9 provides an example of a customer interface including a search utility and a chat utility in accordance with one embodiment of the present invention. A web browser client 904 supports the presentation of a chat window 980 and a knowledge base search window 960 contained within a customer interface 902. In one embodiment, no client software other than a web browser is needed to run the customer interface 902 for the host application. Knowledge base search window 960 contains a reference list 966 and a displayed reference 968, as well as a reject button 970. Reject button 970 is an optional feature that will not be present in all embodiments of the present invention.

Chat window 980 supports communication between a customer and an agent through text-based messaging, as described above. In some embodiments, the chat window can additionally support live video and audio communication. A customer information pane 962 provides an interface for a client to enter information relevant to a customer interaction, such as a username 971, which may contain any identifier used to communicate with a customer, such as a customer's name, username or handle. An area 973 broadly represents a product or service type of interest to the customer on the basis of the customer's entry or selection of an interest or data previously stored in relation to the customer. A subarea 974 more narrowly defines the product or service type of interest to the customer on the basis of the customer's entry or selection of an interest or data previously stored in relation to the customer. A product 975 defines the specific offering of interest to the customer on the basis of the customer's entry or selection of an interest or data previously stored in relation to the customer. A summary 976 provides a brief description of the problem that the customer is encountering. All of this information, as provided by the customer or updated in reference to a database, can be used to populate persistent dashboard 130 and customer information pane 162. A session window 978 displays a record of transmissions between an agent and a customer during a chat session.

Knowledge base search window 960 contains a reference list 966 and a displayed reference 968, as well as a search text entry box 982 and a toolbar 965 allows for the placement of buttons, such as search button 964, chat request button 990 and reject button 970. A search text entry box 982 allows a customer to enter search terms.

When a customer enters a search string in search text entry box 982 and presses search button 964, results are returned to reference list 966. A customer can click on a result in reference list 966 to display a reference. If the displayed reference 968 proves unsatisfactory, the customer may click another reference in reference list 966 for display. In one embodiment, an optional reject button 970 is included, such that a customer can flag a reference as being inadequate to the customer's needs. If the customer requests chat with an agent by pressing chat request button 990, persistent dashboard 130 and customer information pane 162 are populated with the gathered data from customer information pain 962. A search is also performed, using the data from persistent dashboard 130 and customer information pane 162. Reference list 166 is populated with the results of the search, and an agent can select a reference to be shown in a window as displayed reference 168. The search performed to populate reference list 166 and the references displayed (as well as their manner of display) are configurably altered on the basis of the searches entered by the customer through search text entry box 972 prior to the initiation of a chat session and the results viewed by the customer as displayed reference 968, and possibly rejected by the customer using optional reject button 970.

Once populated, the search results remain in knowledge base search window 160 until another search occurs or until a Clear Search command is executed, even when the display window including knowledge base search window 160 is closed. Search data in knowledge base search window 160 is updated so that, when the agent re-opens a display window for knowledge base search window 160, the context information pertains to the currently active customer and application data.

Additionally, knowledge base search window 160 may be configured to include a button in a display window to update dashboard data displayed with information related to application data also being displayed by agent interface 102.

In one embodiment, knowledge base search window 160 is configured to include an Open Search icon (not shown) and a Close Search icon (not shown) that can be selected to open and knowledge base search window 160. In this embodiment, the commands Open Search, Close Search, and Clear Search can also be accessed from an application menu (not shown) using a View command.

In one embodiment, when an incoming communication arrives and notification is provided to the agent by communications toolbar 110, persistent dashboard 130 is automatically updated with key information about the caller, such as the contact name and customer's local time. While this information enables the agent to greet the customer using the proper salutation, the host application retrieves further information about the contact and displays customer-specific information. As persistent dashboard 130 is being populated, a search is also performed, using the data from persistent dashboard 130 and customer information pane 162. Reference list 166 is populated with the results of the search, and an agent can select a reference to be shown in a window as displayed reference 168.

In one embodiment, during a customer interaction session, the agent may highlight any text displayed in agent interface 102, such as highlighted text 179 in chat session window 178 and press smart search button 164 to execute a fresh search. Other areas that can supply searchable text include knowledge base search window 160, persistent dashboard 130 and customer information pane 162. In one embodiment, results viewed by the agent as displayed reference 168 (or by a customer as displayed reference 968) are excluded from display in reference list 166. Exclusion from display can include total exclusion, wherein the reference is not listed in reference list 166 or partial exclusion, where the reference is displayed in reference list 166 but its visibility is reduced by a lighter text font or inclusion at the bottom of reference list 166.

Figure 2:
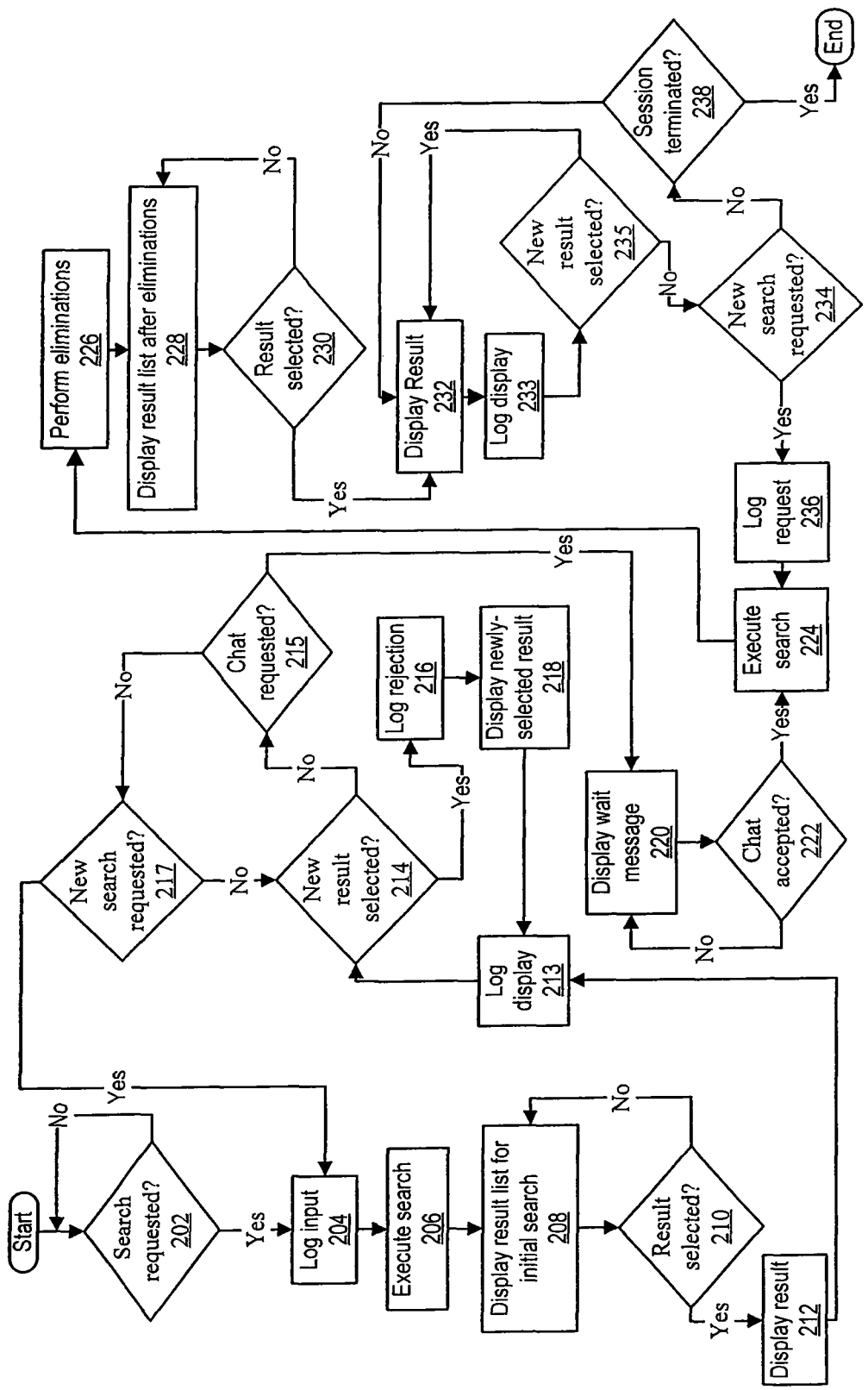
FIG. 2 is a flowchart describing one embodiment of a search utility in accordance with the present invention.

FIG. 2 is a flowchart describing one embodiment of a search utility in accordance with the present invention. After starting, the process proceeds to step 202, which depicts customer interface 902 determining whether a customer has requested a search through search text entry box 982 or search button 964. If customer interface 902 determines that a customer has requested a search through customer interface 902, then the process next moves to step 204. Step 204 illustrates customer interface 902 logging the search input. The process then proceeds to step 206, which depicts the application server, which will be described below with respect to FIG. 3, executing a search of a knowledge base in response to receipt of the logged search request from customer interface 902. The data gathered to populate persistent dashboard 130 and customer information pane 162 is optionally used to refine search results performed at the request of the customer. The process next moves to step 208. Step 208 illustrates customer interface 902 displaying a list of search results as a reference list 966 in knowledge base search window 960.

The process then proceeds to step 210, which depicts customer interface 902 determining whether a result has been selected from among reference list 966 in knowledge base search window 960. If customer interface 902 determines that a result has been selected from among a reference list 966 in knowledge base search window 960, then the process next moves to step 212. Step 212 depicts customer interface 902 displaying a result in the form of displayed reference 968. The process then proceeds to step 213, which depicts customer interface 902 logging the display of the result displayed in step 212. The process next moves to step 214. Step 214 illustrates customer interface 902 determining whether a new result has been selected from among reference list 966 in knowledge base search window 960. If customer interface 902 determines that a new result has been selected from among reference list 966 in knowledge base search window 960, the process then proceeds to step 216, which depicts customer interface 902 logging the rejection of the result displayed in step 212. The process next moves to step 218.

Step 218 illustrates customer interface 902 displaying the newly-selected result from step 214 in the form of displayed reference 968. The process then returns to step 213, which is described above. Returning to step 214, if customer interface 902 determines that a new result has not been selected from among reference list 966 in knowledge base search window 960, the process then proceeds to step 215, which depicts customer interface 902 determining whether a chat has been requested using chat request button 990. If customer interface 902 determines that a chat has not been requested using chat request button 990, then the process next moves to step 217. Step 217 depicts customer interface 902 determining whether a customer has requested a new search through search text entry box 982 or search button 964. If customer interface 902 determines that a customer has requested a new search through customer interface 902, then the process returns to step 204, which is described above. If customer interface 902 determines that a customer has not requested a new search through customer interface 902, then the process returns to step 214, which is described above.

Returning to step 215, if customer interface 902 determines that a chat has been requested using chat request button 990, then the process then proceeds to step 220, which depicts customer interface 902 displaying a wait message to a customer. The process next moves to step 222. At step 222, the process transitions from a customer-search phase to an agent-search phase. Step 222 illustrates customer interface 902 determining whether the chat request of step 215 has been accepted. If customer interface 902 determines that the chat request of step 215 has been accepted, then the process next proceeds to step 224, which depicts an application server, which will be described below with respect to FIG. 3, executing a search of a knowledge base in response to receipt of the chat request from customer interface 902. The data gathered to populate persistent dashboard 130 and customer information pane 162 is also used to refine search results performed at the request of the customer. The process next moves to step 226.

Step 226, which is optional and will not be present in some embodiments of the present invention, illustrates the customer interface 102 performing an elimination from the search results created in step 224 of any references previously displayed to a user of customer interface 902 as displayed reference 968 in step 212 or step 218 and any references previously displayed to a user of customer interface 102 as displayed reference 168 in step 232. Such elimination can include a removal from reference list 166 or a simple obscuring of the reference, for instance by changing a font color in reference list 166. The process then proceeds to step 228, which depicts customer interface 102 displaying results of the search performed in step 224, including exclusions if performed in step 226, as reference list 166. The process next moves to step 230.

Step 230 illustrates agent interface 102 determining whether a result has been selected from among reference list 166 in knowledge base search window 160. If agent interface 102 determines that a result has been selected from among a reference list 166 in knowledge base search window 160, then the process next moves to step 232, which depicts agent interface 102 displaying a most recently-selected result in the form of displayed reference 168. The process then proceeds to step 233, which depicts agent interface 102 logging the display of the result displayed in step 232. The process next moves to step 235. Step 235 illustrates agent interface 102 determining whether a new result has been selected from among reference list 166 in knowledge base search window 160. If agent interface 102 determines that a new result has been selected from among reference list 166 in knowledge base search window 160, the process then returns to step 232, which is described above.

If, however, agent interface 102 determines that a new result has not been selected from among reference list 166 in knowledge base search window 160, the process then proceeds to step 234, which depicts agent interface 102 determining whether a new search has been requested on the basis of highlighted text 179 and smart search button 164. If agent interface 102 determines that a new search has been requested on the basis of highlighted text 179 and smart search button 164, then the process proceeds to step 236. Step 236 depicts agent interface 102 logging the search request. The process then returns to step 224, which is described above.

Returning to step 234, if agent interface 102 determines that a new search has not been requested on the basis of highlighted text 179 and smart search button 164, then the process proceeds to step 238, which depicts agent interface 102 determining whether the current session has been terminated. If agent interface 102 determines that the current session has not been terminated, then the process returns to step 232, which is described above. If agent interface 102 determines that the current session has been terminated, then the process ends.

Figure 3:
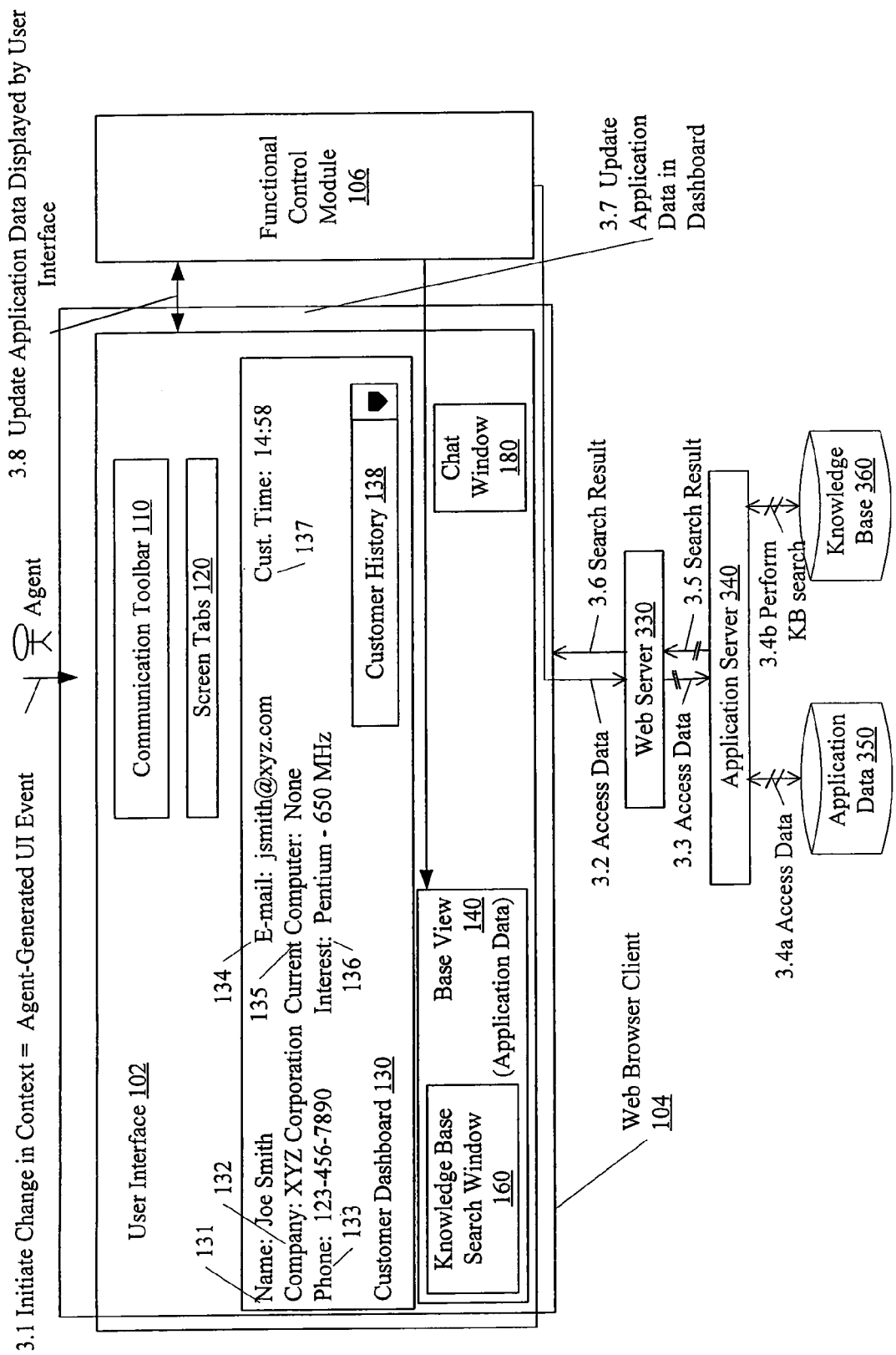
FIG. 3 shows actions taken when operating a search utility in response to agent input in accordance with one embodiment of the present invention.
Figure 5:
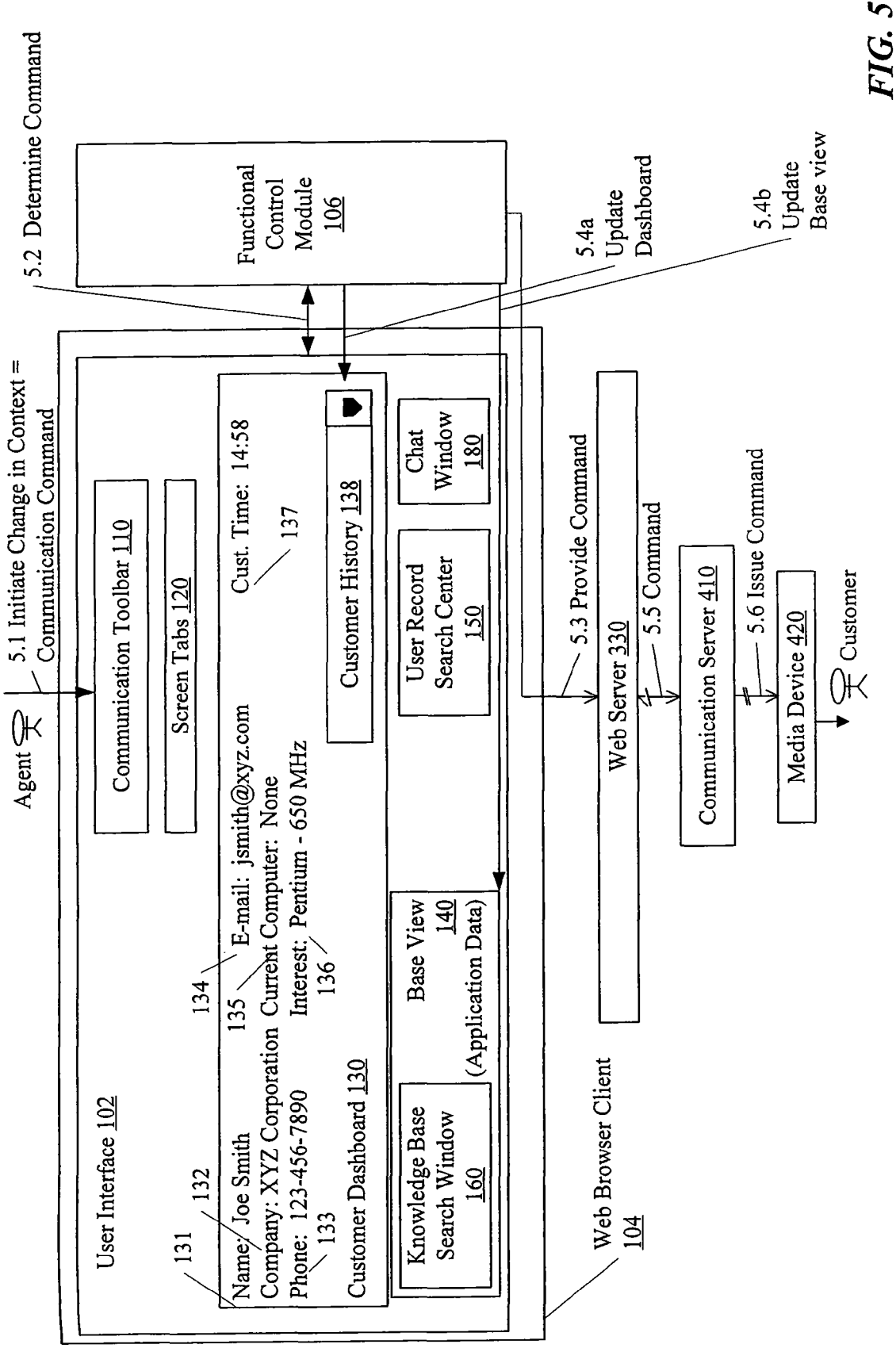
FIG. 5 shows actions taken when updating the persistent dashboard operating a search utility in conjunction with an outgoing communication command in accordance with one embodiment of the present invention.

FIG. 3 shows actions taken when operating a search utility in response to agent input in accordance with one embodiment of the present invention. When an agent requests a search using smartsearch button 164 (or in response to accepting an incoming chat, as depicted in FIG. 5, below), a search is initiated, which in turn updates base view 140. In action 3.1, the agent initiates a search by, for example, selecting highlighted text 179 and actuating smartsearch button 164 (or by accepting an incoming chat). In action 3.2, functional control module 106, which is actually housed on application server 340 but displayed separately for purposes of clarity, passes a request to access data to web server 330. In action 3.3, web server 330 passes the request to access application data to application server 340. Application server 340 includes a knowledge base search business service (not shown) to assist with obtaining data to push to base view 140. As noted by the broken arrow connecting web server 330 to application server 340, intermediate software modules may be present between web server 330 and application server 340.

Application server 340 accesses application data 350, such as customer data from a customer, previous search queries by agent and customer and items viewed by customer and agent, in action 3.4a and performs a search of knowledge base 360 in Action 3.4b. As noted by the broken arrows connecting application server 340 to application data 350 and knowledge base 360, several intermediate modules may be present, such as a database server (not shown). Application server 340 provides search results to web server 330 in action 3.5, and web server 330 provides search results to web browser client 104 in action 3.6. In action 3.7, functional control module 106 updates data in base view 140 with a reference list 166 in knowledge base search window 160. In action 3.8, functional control module 106 updates any additional application data displayed by agent interface 102.

Figure 4:
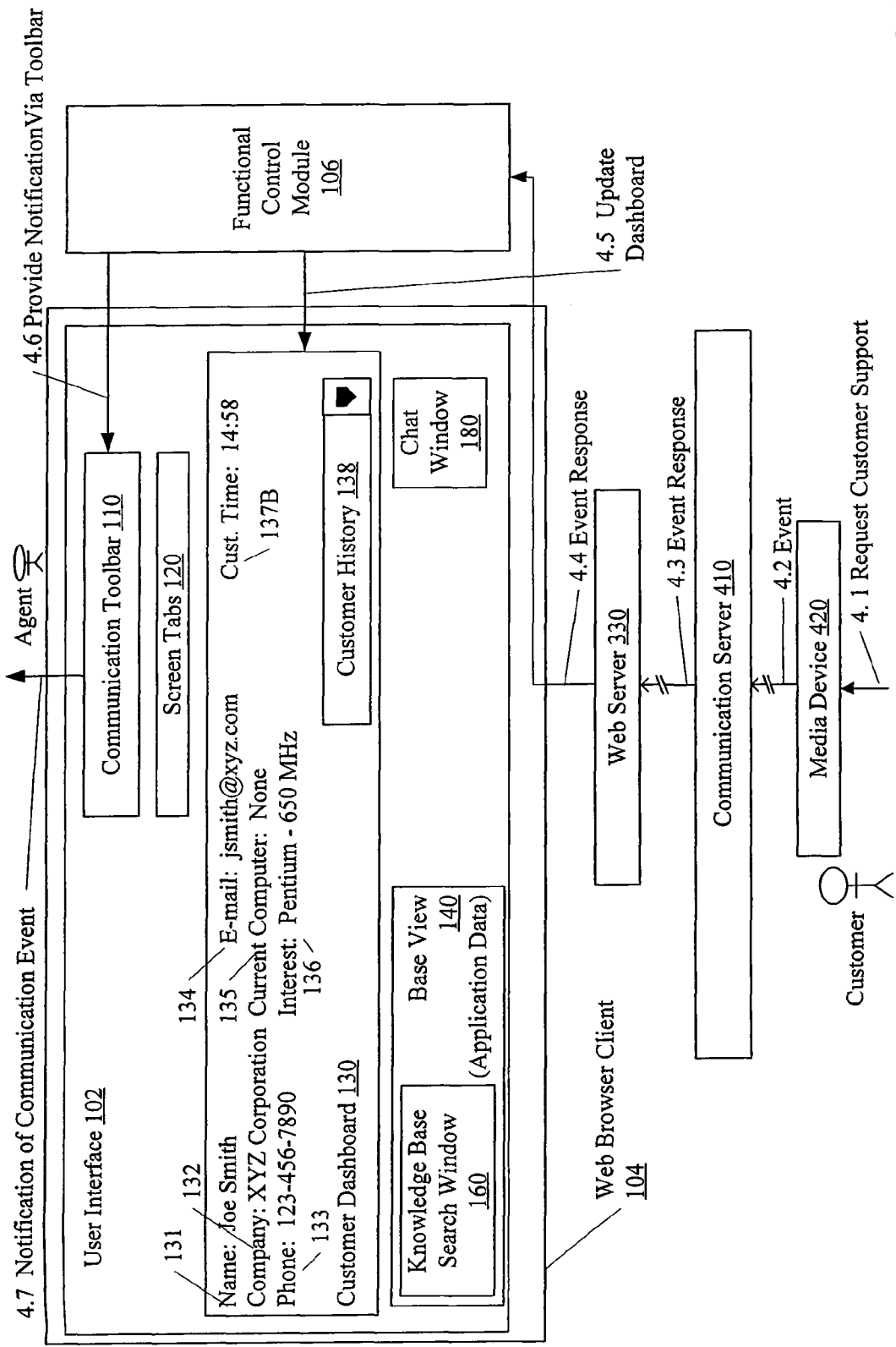
FIG. 4 shows actions taken to support a search utility in response to an incoming communication event in accordance with one embodiment of the present invention.

FIG. 4 shows actions taken to support a search utility in response to an incoming communication event in accordance with one embodiment of the present invention. In action 4.1, the customer places a request for customer support, such as chat, using media device 420 supporting chat window 980. A request for customer support will typically include any known information about the customer, including data gathered to populate persistent dashboard 130 and customer information pane 162, as well as any search strings resulting from search input by the customer at search entry text box 982 and any results viewed as displayed reference 968.

The request for customer support is provided via a series of intermediate software modules (not shown) to communication server 410. Communication server 410 receives the event and provides an event response in action 4.3 to web server 330. Again, as indicated by the broken arrow connecting communication server 410 and web server 330, intermediate software modules may exist between communication server 410 and web server 330. Web server 330 provides the event response to web browser client 104, and functional control module 106 updates persistent dashboard 130 with context information related to the incoming communication event. This context information may include, for example, the name of the customer initiating the telephone call or a chat using customer interface 902. In action 4.6, functional control module 106 provides notification of the incoming communication event to communication toolbar 110. Communication toolbar 110 then provides notification of the communication event to the customer service agent, for example, by causing a button on communication toolbar 110 to blink.

FIG. 5 shows actions taken when updating the persistent dashboard operating a search utility in conjunction with an outgoing communication command, for example, by selecting a button of communication toolbar 110 to receive an incoming chat. Issuing a communication command is similar to the agent-generated agent interface events described with reference to FIG. 3, although other software modules, such as communication server 410 of FIG. 4, are involved. In action 5.1, the customer service agent clicks an Accept Chat button (not shown) on communication toolbar 110 to accept a chat. The resulting communication command produces a change in context that is used to update persistent dashboard 130 and triggers a search, as explained below with respect to FIG. 3, which updates base view 140. Updating persistent dashboard 130 and base view 140 may involve additional modules not shown, such as those of application server 340 of FIG. 3, to perform searches and access application data related to the communication command. In action 5.2, functional control module 106 determines the communication command to be issued. In action 5.3, functional control module 106 provides the command to be issued to web server 330. Web server 330 provides a chat initiation command to communication server 410 and additionally executes a search similar to actions 3.2-3.6 of FIG. 3. In action 5.4a, functional control module 106 updates persistent dashboard 130 with context information related to the chat accepted. In action 5.4b, functional control module 106 updates base view 140 with a reference list 166 relating to the search triggered by chat acceptance. Communication server 410 then issues a chat initiation command in action 5.6, via several intermediate software modules (not shown), to media device 420.

Figure 6:
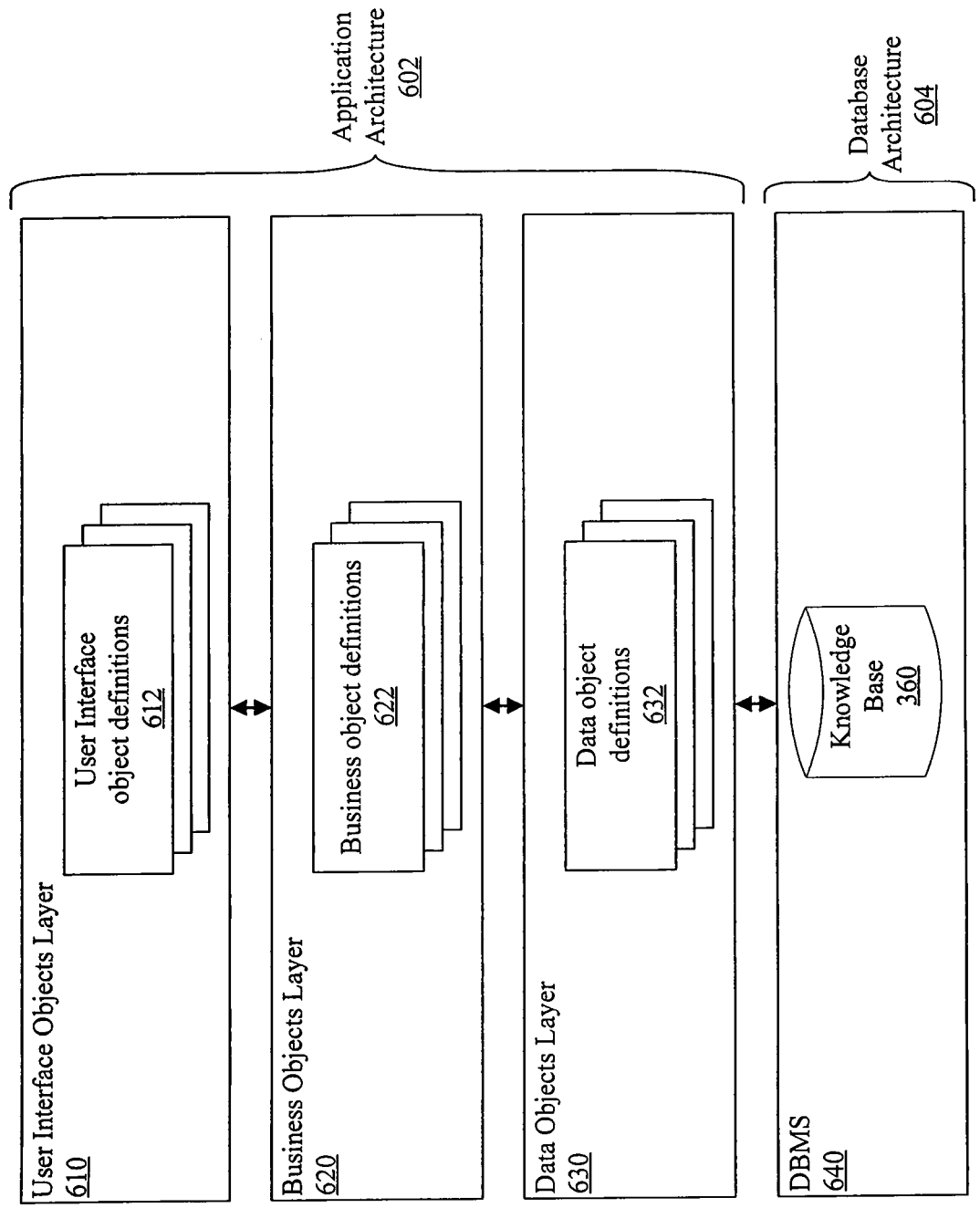
FIG. 6 is a diagram of a layered architecture in which an embodiment of the search utility can be implemented.

FIG. 6 is a diagram of a layered architecture in which an embodiment of the search utility can be implemented and support the operations depicted in FIG. 3, FIG. 4 and FIG. 5. Application architecture 602 includes user interface objects layer 610, business objects layer 620, and data objects layer 630. User interface objects layer 610 includes one or more user interface object definitions 612. An example of a user interface object definition is a view definition for base view 140. Business objects layer 620 includes one or more business object definitions 622. An example of a business object definition is a contact business object definition, which is used to populate persistent dashboard 130 and customer information pane 162. Data objects layer 630 includes one or more data object definitions 632. An example of a data object definition is a schema for a database table. Underlying database architecture 604, which is used to store application data, includes a database management system (DBMS) 640 containing knowledge base 360.

Figure 7:
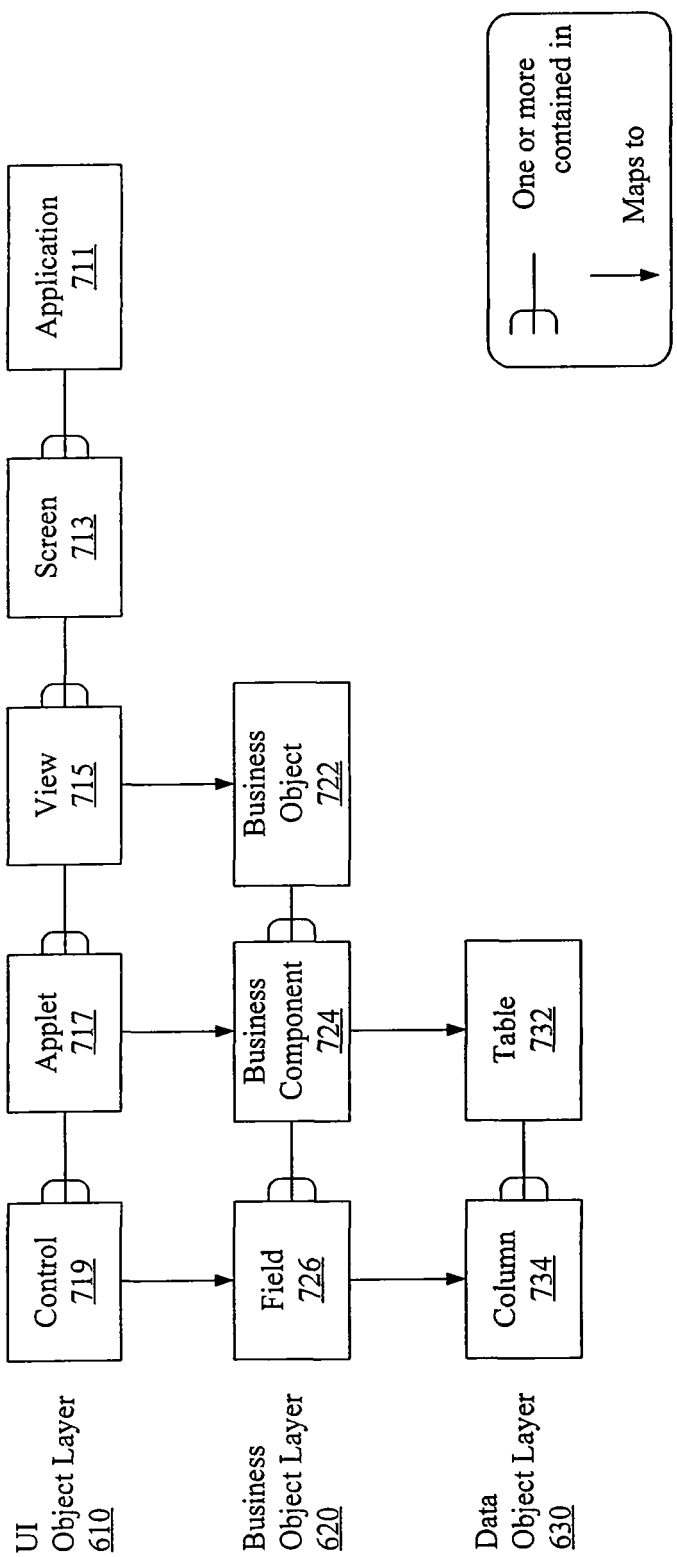
FIG. 7 is a diagram of object layers and object definitions according to the layered architecture of FIG. 6.

FIG. 7 is a diagram of object layers and object definitions according to the layered architecture of FIG. 6. User interface objects layer 610 includes object definitions application 711, screen 713, view 715, applet 717, and control 719. As used herein, an application object definition defines a collection of screens and does not define an application program. Application object definition 711 includes one or more screens 713. Each screen 713 may contain one or more view 715. A view presents one or more applets together at one time in a predefined visual arrangement and logical data relationship. Each view 715 may contain one or more applets 717. In the architecture of the present invention, the term applet is used to describe a form including one or more fields and controls, and is distinguishable from the term applet when used to describe, for example, a Java® program referred to as a Java® applet. Each applet 717 may include one or more control 719.

Business objects layer 620 includes business object definition 722, business component definition 724, and field object definition 726. Each business object definition 722 can include one or more business component object definition 724. Each business component object definition 724 may include one or more field object definition 726.

Data object layer 630 includes table object definition 732 and column object definition 734. Each table object definition 732 can include one or more column object definition 734.

As shown in FIG. 7, view object definition 715 of user interface object layer 610 maps to business object definition 722 of business objects layer 620. A mapping indicates a one-to-one relationship between objects defined according to the object definitions. For example, a contact view of agent interface 102 displays data for a contact business object.

As noted above, a view may include one or more applets, and a business object may include one or more business components. Accordingly, applets object definition 717 of user interface object layer 610 maps to business component object definition 724 of business objects layer 620. A particular applet, or form, of agent interface 102 includes data for a particular business component. Furthermore, a business component, such as business component 724, maps to an object definition, such as table object definition 732, of data objects layer 630. Consequently, a particular applet displays data for a particular business component from a particular data table. In at least one embodiment, a "virtual" business component corresponds to a business component for which data are not obtained from a single database table, but instead are the result of a combination of joins with two or more database tables.

Control object definition 719 of user interface object layer 610 maps to field object definition 726 of business objects layer 620. A particular control within an applet corresponds to a field object definition. Furthermore, field object definition 726 maps to column object definition 734 of data object layer 630. Data for a column of a particular table corresponds to a field of the corresponding business component and is displayed within a control in a corresponding applet.

A search utility, such as knowledge base search window 160, can be implemented as a separate frame and view below communication toolbar 110 or as part of base view 140. Knowledge base search window 160 is based on a virtual business component called "knowledge base search window" which lies in the instance of a "knowledge base search window" business object. Examples of object definitions related to a persistent dashboard, such as knowledge base search window 160, are given below:

Knowledge Base Search Window Business Object
Knowledge Base Search Window Business Component (virtual business component)
Knowledge Base Search Window Business Service (controls the functionality)
Knowledge Base Search Window Applet (user interface)
Knowledge Base Search Window View (user interface)

When updating knowledge base search window 160 from communication toolbar 110, a SmartScript response or an application program can use an UpdateKBSearch application program interface (API) for the Knowledge Base Search Window Business Service. The UpdateKBSearch API can be called using the InvokeMethod function of the Knowledge Base Search Window Business Service and passing a set of name/value pairs, such as the following:

Source Name: 'Base View'
BusComp Name: 'UpdateKBSearch'
RowId: 'referencelist'

In one embodiment, the InvokeMethod function of the Knowledge Base Search Window Business Service is used to call UpdateKBSearch API for configurable events. For example, an enterprise may define a customized event for which reference list 166 is updated and associate the customized event with a button on an applet within the agent interface.

Upon receiving the arguments, the invoked function of the Knowledge Base Search Window Business Service obtains the set of fields configured to be displayed. The involved function then retrieves corresponding data from application databases and knowledge base 360, and populates reference list 166.

In one embodiment, knowledge base search window 160 is configurable. For example, various agent interface changes can be made, such as changing the color, size, location, and adding or removing fields from the display window (applet) displaying knowledge base search window 160.

A search engine within the host application server is responsible for ensuring that knowledge base search window 160 is updated whenever a search occurs. In one embodiment, the search engine is implemented as a search engine business service. The search engine business services provides an application program interface (API) that includes a member function to update knowledge base search window 160 within base view 140. Member functions can correspond to a command definition for a command to, for example, push search results to base view 140. The UpdateKBSearch API may further include a command definition for a maintain command to maintain the context information for display in knowledge base search window 160 window until a second change in context occurs.

The communication administration views can be pre-configured to call InvokeMethod (with UpdateKBSearch as a parameter) when a communication event is received, such as an incoming chat. Variables are passed as arguments to update knowledge base search window 160. When InvokeMethod is called with the UpdateKBSearch parameter, the business service member function UpdatefromCTI obtains the list of fields that are configured to be displayed in knowledge base search window 160. Data to update knowledge base search window 160 can be passed as parameters and/or queried from appropriate application. Since the persistent dashboard is implemented as a business service, a program calling knowledge base search window 160 may use a GetService ("KBSearch") command. The program may set up a control to either push information to knowledge base search window 160 or pull information from knowledge base search window 160.

Figure 8:
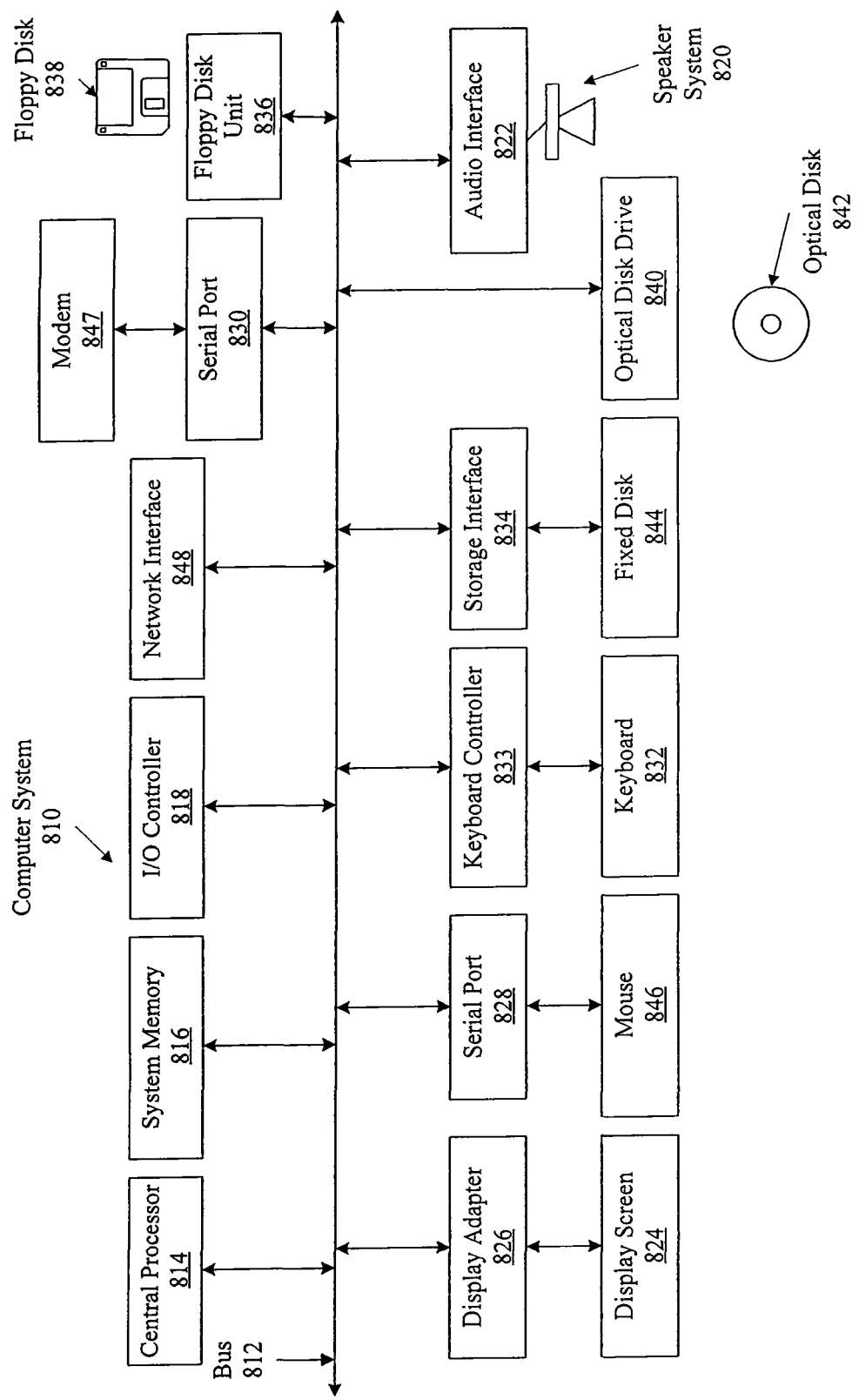
FIG. 8 is a block diagram illustrating a computer system suitable for implementing embodiments of the present invention.

FIG. 8 depicts a block diagram of a computer system 810 suitable for implementing the present invention. Computer system 810 includes a bus 812 which interconnects major subsystems of computer system 810 such as a central processor 814, a system memory 816 (typically RAM, but which may also include ROM, flash RAM, or a similar computer-readable storage medium), an input/output controller 818, an external audio device such as a speaker system 820 via an audio output interface 822, an external device such as a display screen 824 via display adapter 826, serial ports 828 and 830, a keyboard 832 (interfaced with a keyboard controller 833), a storage interface 834 for interfacing with a computer-readable storage medium such as a floppy disk drive 836 operative to receive a floppy disk 838, and a CD-ROM drive 840 operative to receive a CD-ROM 842. Also included are a mouse 846 (or other point-and-click device, coupled to bus 812 via serial port 828), a modem 847 (coupled to bus 812 via serial (or USB) port 830) and a network interface 848 (coupled directly to bus 812).

Bus 812 allows data communication between central processor 814 and system memory 816, which may include both read only memory (ROM) or flash memory (neither shown), and random access memory (RAM) (not shown), as previously noted. The RAM is generally the main memory into which the operating system and application programs are loaded and typically affords at least 816 megabytes of memory space. The ROM or flash memory may contain, among other code, the Basic Input-Output system (BIOS) which controls basic hardware operation such as the interaction with peripheral components. Applications resident with computer system 810 are generally stored on and accessed via a computer readable storage medium, such as a hard disk drive (e.g., fixed disk 844), an optical drive (e.g., CD-ROM or DVD drive 840), floppy disk unit 836 or other storage medium.

Storage interface 834, as with the other storage interfaces of computer system 810, may connect to a standard computer readable storage medium for storage and/or retrieval of information, such as a fixed disk drive 844. Fixed disk drive 844 may be a part of computer system 810 or may be separate and accessed through other interface systems. Many other devices can be connected such as a mouse 846 connected to bus 812 via serial port 828, a modem 847 connected to bus 812 via serial port 830 and a network interface 848 connected directly to bus 812. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 8 to be present to practice the present invention. The devices and subsystems may be interconnected in different ways from that shown in FIG. 8. The operation of a computer system such as that shown in FIG. 8 is readily known in the art and is not discussed in detail in this application. Code to implement the present invention may be stored in computer-readable storage media such as one or more of system memory 816, fixed disk 844, CD-ROM 842, or floppy disk 838. Additionally, computer system 810 may be any kind of computing device, and so includes personal data assistants (PDAs), network appliances, X-window terminals or other such computing devices. The operating system provided on computer system 810 may be MS-WINDOWS®, Mac OS 10®, UNIX®, Linux® or other known operating system. Computer system 810 also supports a number of Internet access tools, including, for example, an HTTP-compliant web browser having a JavaScript interpreter.

Moreover, regarding the messages and/or data signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components. It is to be understood that such architectures are merely examples, and that in fact many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of media used to actually carry out the distribution. Examples of signal bearing media include recordable media such as floppy disks and CD-ROM, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

Although the invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method, comprising:
   providing a customer graphical user interface for use by a customer; and
   providing an agent graphical user interface for use by a customer service agent,
   performing a first search in response to receiving customer search parameters through said customer graphical user interface, wherein
      said performing said first search produces first search results, and
      said performing said first search is performed by a processor;
   performing a second search to return a satisfactory reference in response to initiation of a communication session, wherein
      said communication session is between the customer service agent and a customer,
      said second search is performed using agent search parameters,
      said agent search parameters comprise data displayed using said agent graphical user interface;
      said agent search parameters further comprise
         at least a portion of said first search results, wherein
            said at least a portion of said first search results comprises first data,
      said first data represents items viewed by said customer using said customer graphical user interface,
      said first data comprises unsatisfactory references,
      said unsatisfactory references are configured to be identified by said customer through said customer graphical user interface, and
      said performing said second search is performed by the processor; and
   displaying second results of said second search through said agent graphical user interface, wherein
      said displaying second results further comprises
         excluding said first data from being displayed with said second results.

2. The method of claim 1, wherein
   said communication session comprises a session window,
   said session window displays a record of transmissions between said customer service agent and said customer,
   at least one of the transmissions comprises text, and
   a third search is performed using said text displayed in said session window.

3. The method of claim 1, further comprising:
   performing a third search, wherein
      said third search is performed using
         said first results,
         attributes of a service interaction,
         second data reflecting items viewed by said customer service agent from
         among said second results of said second search, and
         third data selected by said customer service agent; and
   displaying to said customer service agent third results of said third search.

4. The method of claim 3, wherein
   said third data selected by said customer service agent further comprises:
      communication data from said communication session, and
   said service interaction is between said customer and an entity represented by said customer service agent.

5. The method of claim 4, wherein said displaying to said customer service agent said third results of said third search further comprises:
   excluding items viewed by said customer service agent from among said second results.

6. The method of claim 4, wherein said displaying to said customer service agent said third results of said third search further comprises:
   excluding said items viewed by said customer from among said first search results.

7. The method of claim 1, wherein said excluding said items viewed by said customer further comprises:
   displaying with reduced visibility said items viewed by said customer.

8. The method of claim 1, wherein
   said performing a first search comprises providing said customer search parameters to a search engine and receiving said first search results from the search engine, and
   said performing a second search comprises providing said agent search parameters to the search engine and receiving said second results from the search engine.

9. The method of claim 1, further comprising:
   updating the second search in response to a change in context information displayed by the agent graphical user interface.

10. The method of claim 9, wherein
    said change in context information is associated with
       receiving a communication transmission,
       obtaining data entered by the customer through the customer graphical user interface,
       selecting a reference from among the second results, or
       selecting an update button within the agent graphical user interface.

11. A non-transitory computer-readable storage medium, comprising:
    a first set of instructions, executable by a processor, configured to provide a customer graphical user interface for use by a customer;
    a second set of instructions, executable by the processor, configured to provide an agent graphical user interface for use by a customer service agent;
    a third set of instructions, executable by the processor, configured to perform a first search in response to receiving customer search parameters through said customer graphical user interface, wherein
       said first search produces first search results;
    a fourth set of instructions, executable by the processor, configured to perform a second search to return a satisfactory reference, in response to initiating a communication session, wherein
       said communication session is between the customer service agent and the customer,
       said second search is performed using agent search parameters,
       said agent search parameters comprise data displayed using said agent graphical user interface;
       said agent search parameters further comprise
          at least a portion of said first search results, wherein
             said at least a portion of said first search results comprises first data,
       said first data represents items viewed by said customer using said customer graphical user interface,
       said first data comprises unsatisfactory references, and
       said unsatisfactory references are configured to be identified by said customer;
    a fifth set of instructions, executable by said processor, configured to
       display second results of said second search through said agent graphical user interface, and exclude said first data from being displayed with said second results.

12. The non-transitory computer-readable storage medium of claim 11, wherein
said communication session comprises a session window,
said session window displays a record of transmissions between said customer service agent and said customer,
at least one of the transmissions comprises text, and
a third search is performed using said text displayed in said session window.

13. The non-transitory computer-readable storage medium of claim 11, further comprising:
a sixth set of instructions, executable by said processor, configured to perform a third search, wherein
said third search is performed using
said first results,
attributes of a service interaction,
second data reflecting items viewed by said customer service agent from among said second results of said second search, and
third data selected by said customer service agent; and
a seventh said of instructions, executable by said processor, configured to display to said customer service agent third results of said third search.

14. The non-transitory computer-readable storage medium of claim 13, wherein
said third data selected by said customer service agent further comprises:
communication data from said communication session, and
said service interaction is between said customer and an entity represented by said customer service agent.

15. The non-transitory computer-readable storage medium of claim 14, wherein said seventh set of instructions further comprises:
an eighth set of instructions, executable by said processor, configured to exclude items viewed by said customer service agent from among said second results.

16. The non-transitory computer-readable storage medium of claim 14, further comprising:
a ninth set of instructions, executable by said processor, configured to exclude said items viewed by said customer from among said first search results.

17. The non-transitory computer-readable storage medium of claim 11, further comprising:
a tenth set of instructions, executable by said processor, configured to display with reduced visibility said items viewed by said customer.

18. An apparatus comprising:
a processor;
means for causing said processor to provide a customer graphical user interface for use by a customer;
means for causing said processor to provide an agent graphical user interface for use by a customer service agent;
means for causing said processor to perform a first search in response to receiving customer search parameters through said customer graphical user interface, wherein said first search produces first search results;

means for causing said processor to perform a second search to return a satisfactory reference, in response to initiating a communication session, wherein
said communication session is between the customer service agent and the customer,
said second search is performed using agent search parameters,
said agent search parameters comprise data displayed using said agent graphical user interface,
said agent search parameters further comprise
at least a portion of said first search results, wherein said at least a portion of said first search results comprises first data,
said first data represents items viewed by said customer using said customer graphical user interface,
said first data comprises unsatisfactory references, and
said unsatisfactory references are configured to be identified by said customer through said customer graphical user interface; and
means for causing said processor to display second results of said second search through said agent graphical user interface, wherein
said first data is excluded from being displayed with said second results.

19. The apparatus of claim 18, wherein
said communication session comprises a session window,
said session window displays a record of transmissions between said customer service agent and said customer,
at least one of the transmissions comprises text, and
a third search is performed using said text displayed in said session window.

20. The apparatus of claim 18, further comprising:
means for causing said processor to perform a third search, wherein
said third search is performed using
said first results,
attributes of a service interaction,
second data reflecting items viewed by said customer service agent from among said second results of said second search, and
third data selected by said customer service agent; and
means for causing said processor to display to said customer service agent third results of said third search.

21. The apparatus of claim 20, wherein
said third data selected by said customer service agent further comprises:
communication data from said communication session, and
said service interaction is between said customer and an entity represented by said customer service agent.

22. The apparatus of claim 20, further comprising:
means for causing said processor to exclude items viewed by said customer service agent from among said second results.

23. The apparatus of claim 18, further comprising:
means for causing said processor to exclude said items viewed by said customer from among said first search results.

* * * * *

UNITED STATES PATENT AND TRADEMARK OFFICE
CERTIFICATE OF CORRECTION

PATENT NO. : 8,805,822 B2  
APPLICATION NO. : 12/114114  
DATED : August 12, 2014  
INVENTOR(S) : Jaffer et al.

Page 1 of 1

It is certified that error appears in the above-identified patent and that said Letters Patent is hereby corrected as shown below:

In the Claims

In column 17, line 22, in Claim 13, delete "said" and insert -- set --, therefor.

Signed and Sealed this
Fourteenth Day of July, 2015

Michelle K. Lee
*Director of the United States Patent and Trademark Office*